United States Patent [19]
Garvert

[11] 3,858,744
[45] Jan. 7, 1975

[54] SUPPORT MEANS FOR HOLDING THE COVER OF A LOAD CARRYING BOX IN DIFFERENT POSITIONS

[76] Inventor: Clarence F. Garvert, 1013 N. 2nd St., Garden City, Kans. 67846

[22] Filed: Oct. 16, 1972

[21] Appl. No.: 297,768

[52] U.S. Cl.............. 217/60 G, 220/29, 220/30, 296/23 H, 296/100
[51] Int. Cl............................................ B65d 43/24
[58] Field of Search............. 296/100, 137 B, 23 H; 135/1 A, 4 A; 220/29, 30, 34; 108/115, 128, 134; 312/290, 325, 327; 217/60 G

[56] References Cited
UNITED STATES PATENTS

| | | | |
|---|---|---|---|
| 1,178,734 | 4/1916 | Krause | 135/1 A |
| 1,644,892 | 10/1927 | Noble | 296/23 H |
| 3,465,807 | 9/1969 | Beas | 160/193 |
| 3,489,452 | 1/1970 | Plante | 135/1 A |

Primary Examiner—David Schonberg
Assistant Examiner—Michael J. Forman

[57] ABSTRACT

A support means for holding the panels of a cover for a pick-up truck in various positions. The support means has a first brace for holding the cover in a vertical position and a strut and a second brace for holding the cover in an outward horizontal position. The first brace has a locking means to hold the brace from collapsing. A catch means is provided to secure the strut to the frame when the panel is in the vertical or inward horizontal position.

10 Claims, 10 Drawing Figures

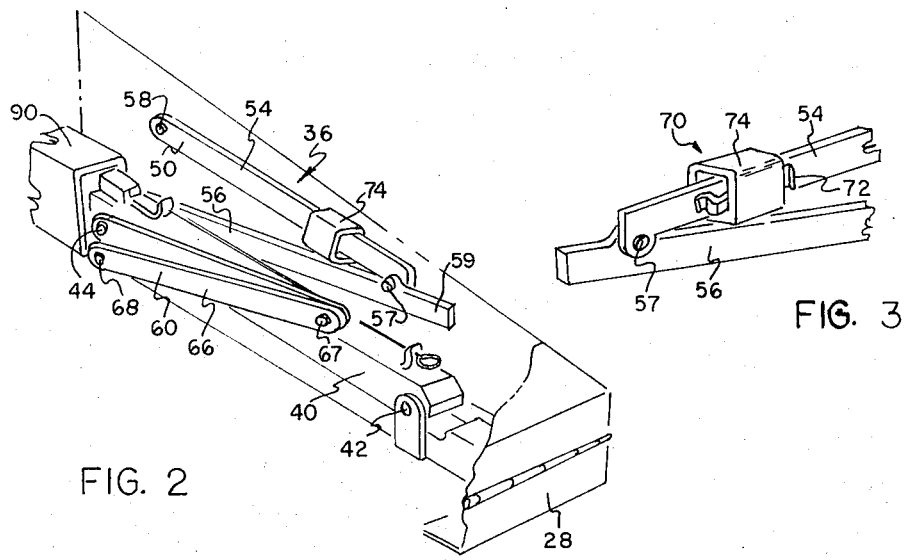
FIG. 2
FIG. 3
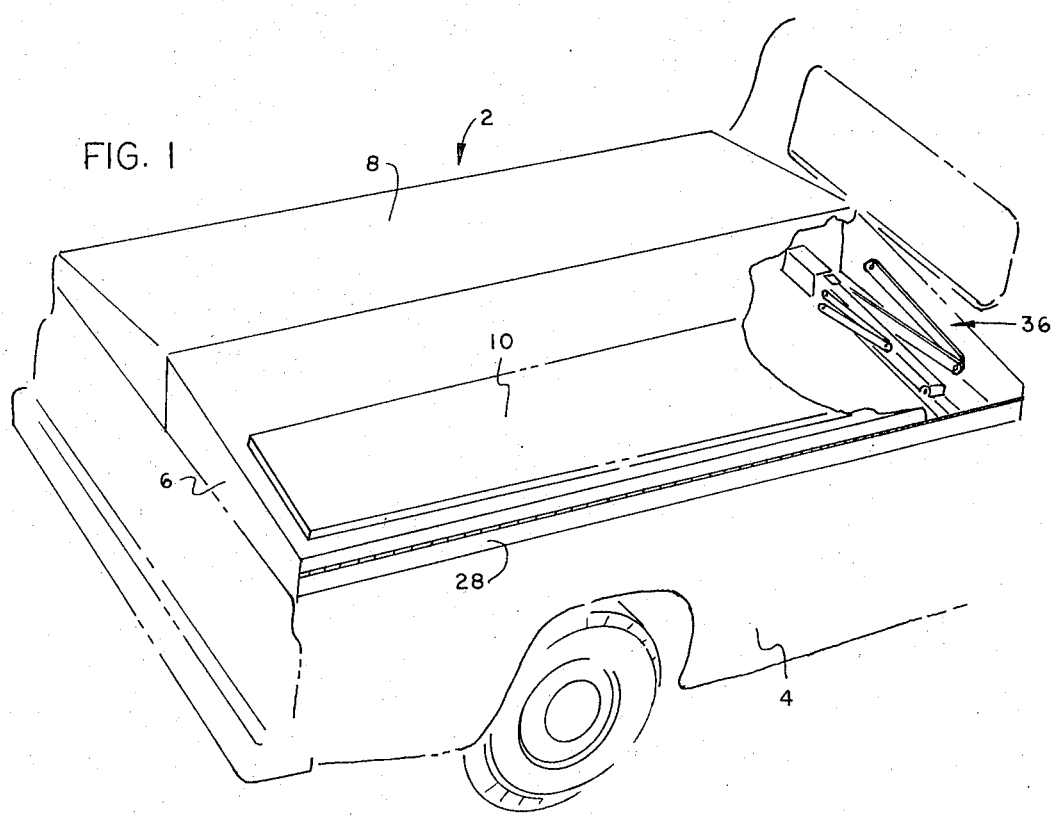
FIG. 1

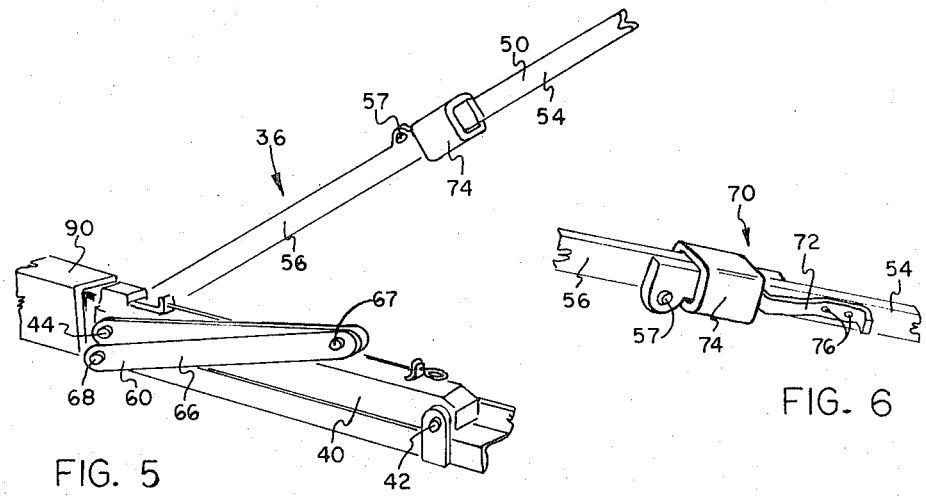
FIG. 5
FIG. 6
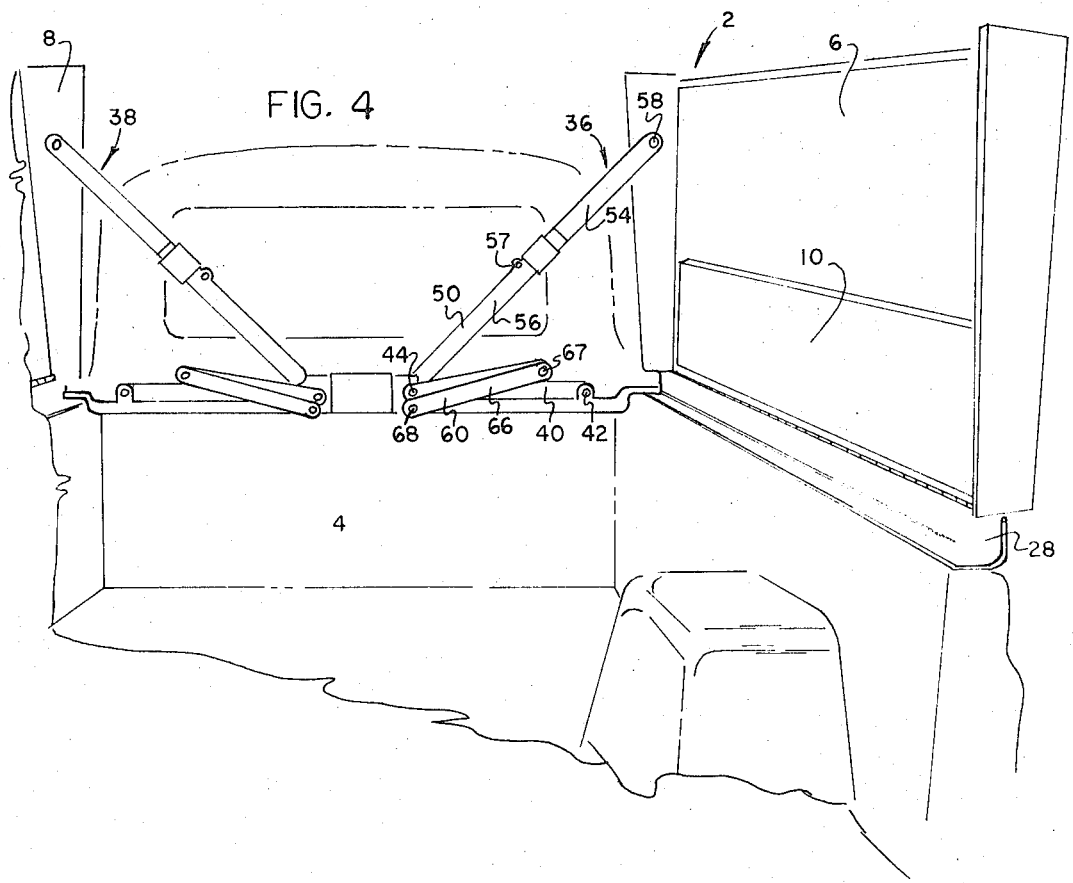
FIG. 4

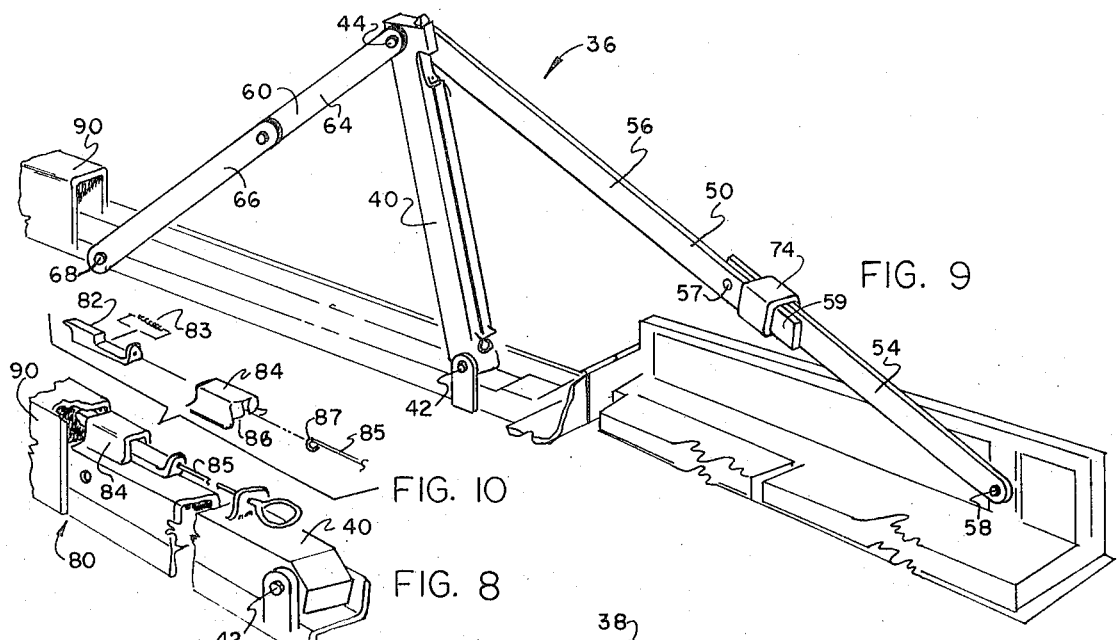
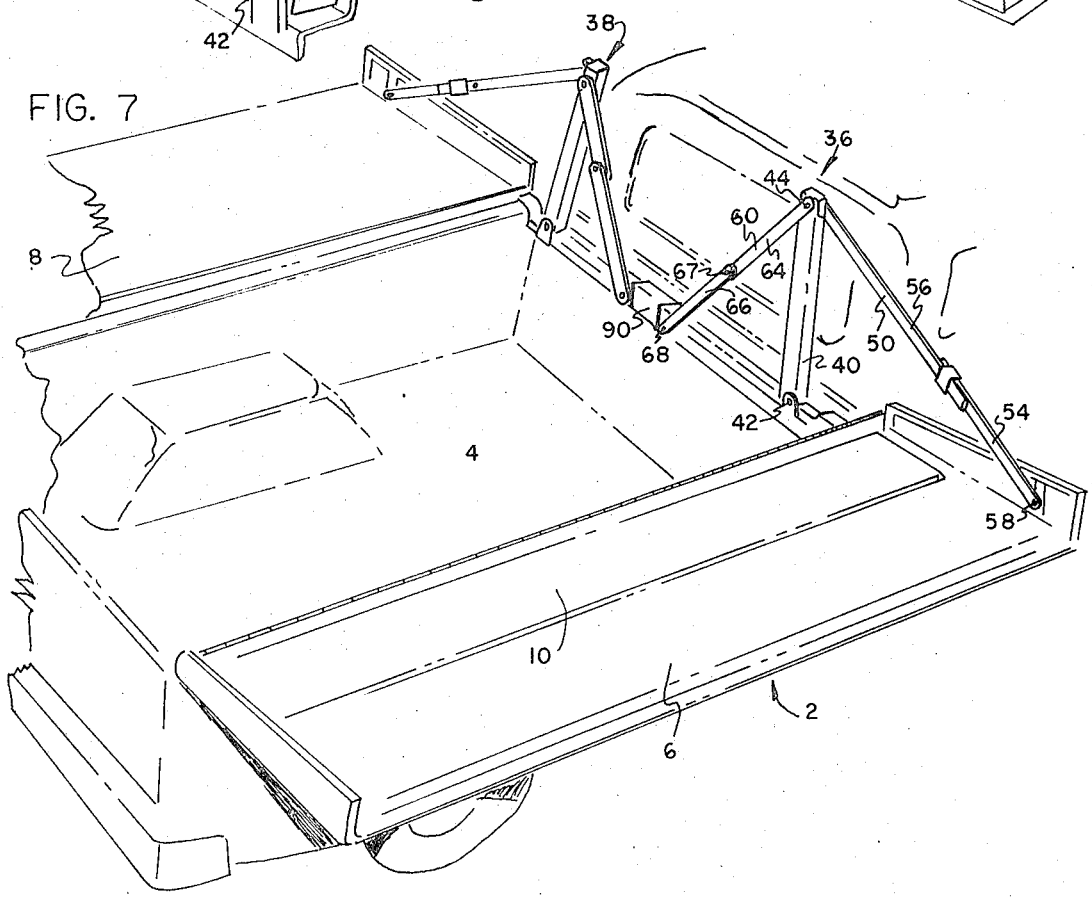

3,858,744

SUPPORT MEANS FOR HOLDING THE COVER OF A LOAD CARRYING BOX IN DIFFERENT POSITIONS

BACKGROUND OF THE INVENTION

The field of the invention pertains to land vehicles and more particularly to that portion of the vehicle which operates as a receptacle or load carrier with a top or cover convertible into different forms or shapes to adapt it for various purposes.

This invention is an improvement over the support means disclosed in my prior U.S. Patent Application Ser. No. 114,602 filed Feb. 11, 1971 for "Cover for a pick-up truck" now U.S. Pat. No. 3,765,717. As shown in my prior application a support means is provided for holding the panels of the cover in a vertical or an outward horizontal position. In the prior art while there has been provided a means to hold the panels in a vertical position, as shown in U.S. Pat. No. 3,069,199, there has not been provided a means to hold the panels in both a vertical or an outward horizontal position. Unless a means is provided for securing the panels in a horizontal outward position the panels would drop and hit and dent the sidewalls of the bed of the pick-up truck or its fenders. It is desirable to secure the panels in an outward horizontal position in order to affix a tent and bow attachment thereto for camping purposes. My prior application shows one means to support the panels in the various positions and this application is an improvement thereon.

SUMMARY OF THE INVENTION

In accordance with the present invention there is provided a new and useful support means for holding the panels of a cover for a pick-up truck in a vertical or outward horizontal position relative to the load carrying boy. The support means has a first brace for holding the cover in a vertical position. The first brace has a locking means to prevent its collapse. A strut and a second brace are provided to hold the panel in the outward horizontal position. A catch means secures the strut to the frame when the panel is in the vertical or inward horizontal position.

Therefore, the objects of the invention are to provide a novel support means for holding the panels of a cover for a pick-up truck in various positions to provide a support means having two collapsable braces and a strut, to provide a support means where one of the braces has a locking means to prevent its collapse, and to provide a support means having a strut that is held by a catch when the panel is in the vertical or inward horizontal position, the strut being released by the catch to move the panel into the outward horizontal position.

BRIEF DESCRIPTION OF THE DRAWINGS

FIG. 1 is a perspective view of the cover for a pick-up truck having the panels in a closed position with the right panel having a portion eliminated to reveal the support means in a collapsed position.

FIG. 2 is a perspective view showing the support means for the right panel in the collapsed position in greater detail.

FIG. 3 is a perspective view from the front showing the pivot arrangement of the first brace means and its locking means for the right panel when the support means is in the collapsed position.

FIG. 4 is a perspective view looking forward toward the cab of the pick-up truck with the panels of the cover in a vertical position.

FIG. 5 is a perspective view showing the support means for the right panel in greater detail when the right panel is in a vertical position.

FIG. 6 is a perspective view from the front showing the locking means in a position locking the two arms of the brace means.

FIG. 7 is a perspective view showing the panels of the cover in an outward horizontal position.

FIG. 8 is a perspective view showing the latch means for the right panel.

FIG. 9 is a perspective view showing the support means for the right panel in greater detail when the right panel is in an outward horizontal position.

FIG. 10 is an exploded view of the latch means for the right panel

DESCRIPTION OF THE PREFERRED EMBODIMENT

Referring now to FIGS. 1, 4 and 7 a cover 2 is shown mounted on the load carrying box 4 of a pick-up truck. The cover 2 has a right panel 6 and a left panel 8 and, as shown for right panel 6, a door 10 may be provided to allow access to the interior of the pickup box 4 when the panels are closed. The panels 6 and 8 are hinge mounted on a frame 28 so they may be moved to a position closing the load carrying box — FIG. 1 — to a vertical position — FIG. 4 — and then to an outward horizontal position — FIG. 7. Attached to the frame 28 and panel 6 is a support means 36 to hold the panel 6 in the vertical or outward horizontal position. A minor image support means 38 is attached between frame 28 and panel 8 for the same purpose for panel 8.

As shown in FIGS. 2, 4 and 9 the support means 36 has a strut 40, a first brace 50 and a second brace 60. The strut 40 is secured at one of its ends to the frame 28 to rotate about pivot 42. At its other end at pivot 44 strut 40 is attached on one side to first brace 50 and on the opposite side to second brace 60. The First brace 50 has an outer arm 54 and an inner arm 56. Outer arm 54 is attached to panel 6 at pivot 58, inner arm 56 is pivotable attached to strut 40 at pivot 44, an extension 59 of the inner arm 56 projects beyond the pivot 57 where arms 54 and 56 are attached together, and is used in the locking of the two arms 54 and 56 together as will be explained in detail hereinafter in this specification. The second brace 60 has an outer link 64 and an inner link 66 attached together at pivot 67. Outer link 64 is attached to strut 40 at pivot 44. Inner link 66 is attached to frame 28 at pivot 68.

As seen in FIGS. 1 and 2 when the panel 6 is in the inward horizontal position to cover box 4 the support means 36 is in a collapsed position where strut 40, arms 54, 56 and links 64, 66 are in a substantially parallel side by side collapsed relationship. When panel 6 is in the vertical position, as seen in FIGS. 4 and 5, strut 40 and links 64, 66 remain in the side by side relationship, while arms 54, 56 rotate 180 degrees about pivot 57 from a side by side position to form a straight line which acts as a brace to hold the panel upright. In the horizontal outward position, as seen in FIGS. 7 and 9, the arms 54, 56 remain unfolded in a straight line. However, links 64, 66 are rotated 180 degrees about pivot 67 from a side by side position to form a straight line, and strut 40 is moved from a position parallel to frame 28 to form an inward acute angle to the frame 28. In this position the weight of panel 6 is transmitted through brace 50 to strut 40 and brace 60 to hold panel 6 securely.

Reference is now made to FIGS. 2,3,5 and 6 where a locking means 70 is shown to secure arms 54,56 to brace 50 in the 180 degree position when the panel 6 is in the vertical position. The locking means 70 comprises a retainer 72 and a hollow square shapped sleve 74. Retainer 72 may take the shape of two fillets secured lengthwise with lugs protruding in opposite directions and has a leaf spring resilience. The retainer 72 is secured to arm 54 by means of rivets, bolts, or screws 76 or any other suitable means. With the panel 6 in the outward horizontal position and the support means 36 collapsed sleeve 74 is telescoped over retainer 72 and arm 54 and held in this position by the spring resilience of retainer 72 as seen in FIG. 3. Referring now to FIG. 6, after panel 6 is moved to the vertical position sleeve 74 is moved oxially off of retainer 72 and around extension 59 of inner arm 56 so as to hold arms 54 and 56 from movement relative to each other about pivot 57. Sleeve 74 is held in this position by a lug on retainer 72 so that when the pick-up truck travels over bumpy roads there is no danger of the sleeve 74 to slip up along brace 50 and allow panel 6 to assume a position other than vertical. When moving the panel to the inward vertical position, retainer 72 is depressed allowing sleeve 74 to slide oxially over the retainer where it is held by the resilience of the retainer.

A latch means 80 shown in FIGS. 8, 9 and 10 is provided to release strut 40 and allow panel 6 to move from a vertical to an outward horizontal position. The latch means 80 comprises a bolt 82, a coil spring 83, channel member 84, and a pull rod 85. Bolt 82 is cut away at one end to form a notch into which the coil spring 83 fits. Channel member 84 has an interior flange 86 with a vertical slit. A hook 87 on pull rod 85 is fastened through an eye on the notched end of bolt 82. Bolt 82, spring 83 and the hook 87 are fit into channel member 84 with the interior flange 86 fitting into the notched portion of bolt 82 between the spring 83 and the eye end of bolt 82. Pull rod 85 fits through the slit in flange 86. Channel member 84 is then secured to strut 40 as its end near pivot 44. A catch means 90 is provided on frame 28 to receive bolt 82 and thereby latch strut 40 to the frame. Spring 83 biases bolt 82 to the latching position with catch 90. To move the panel 6 from a vertical position to the outward horizontal position rod 85 is pulled to move bolt 82 out of latching position with catch 90 thereby compressing spring 83. Upon release of the latch means 80 strut 40 is allowed to rotate about pivot 42 moving links 64 and 66 180 degrees about pivot 67 from a side by side relationship thus allowing the panel 6 to assume an outward horizontal position.

In this outward horizontal position a tent and bow attachment may be affixed to the panels to provide an all weather tent. The additional room provided allows for additional sleeping spaces within the tent on the panels 6 and 8. The present invention allows for a much larger cover to be placed over the bed of the pick-up truck to provide a larger tent than in conventional arrangements as shown in U.S. Pat. No. 3,069,199. Also the strut and braces of the support means hold the panels secure and sturdy in each of the various positions. The weight of panels 6 and 8 and of any occupants or other weight placed on the panels is transmitted to the frame 28 by the braces and the strut to provide a stable cover.

It is of course evident that changes and modifications may be made in the invention as shown and described herein which will fall within the spirit of this invention. Accordingly, I intend to be limited only by a broad interpretation of the appended claims.

I claim:

1. In combination with a cover for a load carrying box: said cover including a panel, said panel being hinge mounted to a frame and being moveable from a horizontal position enclosing said box to a vertical position and then to an outward horizontal position relative to said box, a support means to secure said panel in said vertical or outward horizontal positions, said support means including first and second braces and a strut, said strut pivotally secured at one of its ends to said frame, said first brace secured at one of its ends to said panel, said second brace secured at one of its ends to said frame, said strut and said first and second braces joined together at their other ends.

2. The combination of claim 1, wherein said first brace contains a first arm and a second arm, said arms pivotally connected to each other at one of their ends, said first arm pivotally connected at its other end to said panel, said second arm pivotally connected at its other end to said strut.

3. The combination of claim 2 wherein said first brace is collapsible whereby said arms are in a substantially parallel position and including a locking means, said second arm having an extension beyond the pivotal connection with said first arm, said arms being moveable about said pivotal connection from the substantial parallel position to a straight line position, said locking means including a retainer secured to said first arm and a sleeve encircling said first arm and moveable from a first position encircling said first arm and said retainer to a second position encircling said first arm and said extension of said second arm to hold said arms from movement relative to each other.

4. The combination of claim 1 wherein said second brace includes first and second links pivotally connected together at one of their ends, said first link connected at its other end to said strut, said second link connected at its other end to said frame.

5. The combination of claim 1 including a latch means for latching said strut at its other end to said frame, said latch means being releasable whereby said strut may pivot about its one end.

6. The combination of claim 5 wherein said latch means has a catch secured to said frame and a bolt attached to and moveable relative to said strut said bolt engaging said catch when said strut is in a horizontal position relative to said frame, said strut being moveable about its pivotable connection to said frame when said bolt is disengaged from said catch.

7. The combination of claim 1 including said strut and said braces being in a substantially parallel collapsed position when said panel is in said horizontal position enclosing said box, said first brace being at an angle to said strut and said second brace when said panel is in the vertical position, said strut and said braces being at an angle relative to said frame when said panel is in the outward horizontal position to thereby transmit the weight of said panel via said strut and said braces to said frame.

8. The combination of claim 1 including said first brace having a first arm and a second arm, said arms pivotally connected to each other at one of their ends, said first arm pivotally connected at its other end to said palen, said second arm pivotally connected at its other end to said strut, said second brace having a first link and a second link, said links pivotally connected together at one of their ends, said first link pivotally connected at its other end to said strut and said second link pivotally connected at its other end to said frame. panel, 9. The combination of claim 8 wherein said second arm has an extension beyond the pivot connection with said first arm, a locking means on said first brace including a retainer and a sleeve, said retainer secured to said first arm said sleeve encircling said first arm and moveable from a first position encircling said first arm and said retainer to a second position encircling said first arm and said extension of said second arm when said panel is in a vertical position to thereby lock said arms from movement relative to each other, said reatiner holding said sleeve in said second position.

10. The combination of claim 9 including a latch means having a catch secured to said frame and a bolt attached to and moveable relative to said strut, said bolt engaging said catch when said strut is in a horizontal position relative to said frame, said strut being moveable about its pivotal connection to said frame when said bolt is disengaged from said catch to allow said panel to move to an outward horizontal position.

* * * * *